United States Patent [19]

Wiley, deceased et al.

[11] Patent Number: 4,814,772
[45] Date of Patent: Mar. 21, 1989

[54] METHOD AND APPARATUS FOR PRECISELY MEASURING RELATIVE VELOCITY IN AN INTERFEROMETRIC RADIOMETER

[75] Inventors: Carl A. Wiley, deceased, late of Westchester, Calif., by Jean B. Wiley, executrix; Jean B. Wiley, both of Westchester, Calif.

[73] Assignee: Hughes Aircraft Company, Los Angeles, Calif.

[21] Appl. No.: 881,440

[22] Filed: Jul. 2, 1986

[51] Int. Cl.[4] .............................................. G01S 3/02
[52] U.S. Cl. ..................................... 342/351; 342/108
[58] Field of Search .............. 342/104, 105, 108, 189, 342/156, 424, 442, 461, 351

[56] References Cited

U.S. PATENT DOCUMENTS

| | | |
|---|---|---|
| 3,004,219 | 10/1961 | Albert . |
| 3,131,891 | 12/1978 | Stavis . |
| 3,167,738 | 1/1965 | Westerfield ..................... 342/189 X |
| 3,680,105 | 7/1972 | Goldstone ....................... 342/189 X |
| 3,798,590 | 3/1974 | Jacobson et al. ................ 342/189 X |
| 4,041,293 | 8/1977 | Kihlberg . |
| 4,131,891 | 12/1978 | Stavis ................................ 342/461 |
| 4,398,274 | 8/1983 | Chotiros ......................... 342/189 X |
| 4,509,052 | 4/1985 | Cash ................................. 342/424 X |

FOREIGN PATENT DOCUMENTS

| | | |
|---|---|---|
| 0168335 | 1/1986 | European Pat. Off. . |
| 3030229 | 3/1982 | Fed. Rep. of Germany . |
| 3435866 | 4/1986 | Fed. Rep. of Germany . |
| 85/05189 | 11/1985 | PCT Int'l Appl. . |
| 910208 | 11/1962 | United Kingdom . |

OTHER PUBLICATIONS

"Introduction to Communications Systems"; Ferrel Stremler; p. 104; 1982; Addison-Wesley Publishing.

Primary Examiner—Thomas H. Tarcza
Assistant Examiner—Tod Ray Swann
Attorney, Agent, or Firm—S. M. Mitchell; M. J. Meltzer; A. W. Karambelas

[57] ABSTRACT

A method and apparatus for precisely determining the relative velocity of an interferometer and a scene being scanned. The apparatus uses a matched filter technique in which reference signals based on high and low relative velocity estimates are correlated with an incoming interferometer signal and controllably adjusted until the correlation is maximized. The controllably adjusted reference signals are then used to produce an extremely accurate and precise measurement of relative velocity.

19 Claims, 5 Drawing Sheets

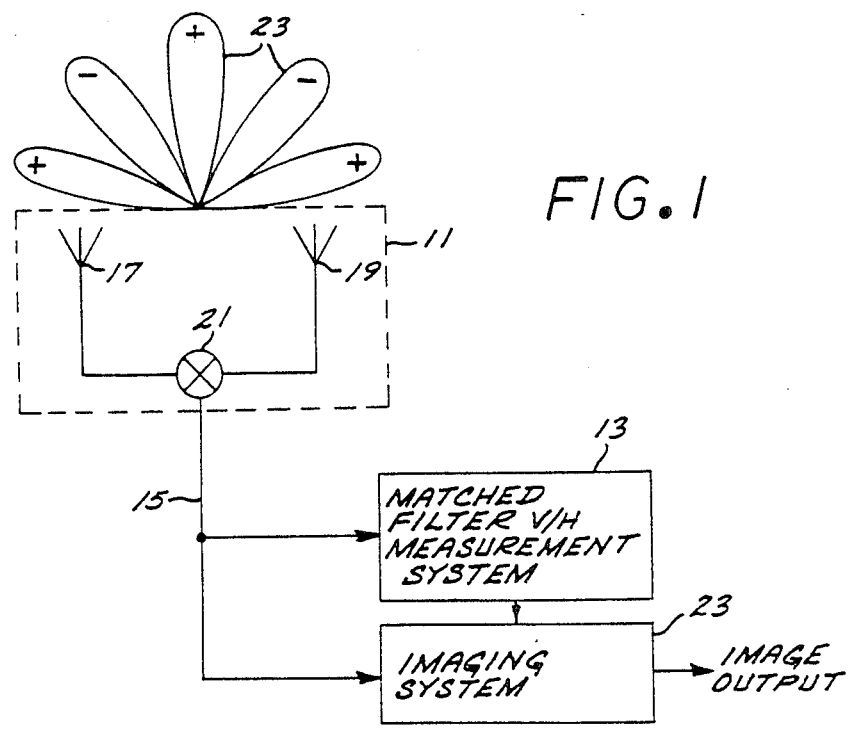
FIG. 1
FIG. 2
INTERFEROMETER SIGNAL FOR SINGLE POINT SOURCE
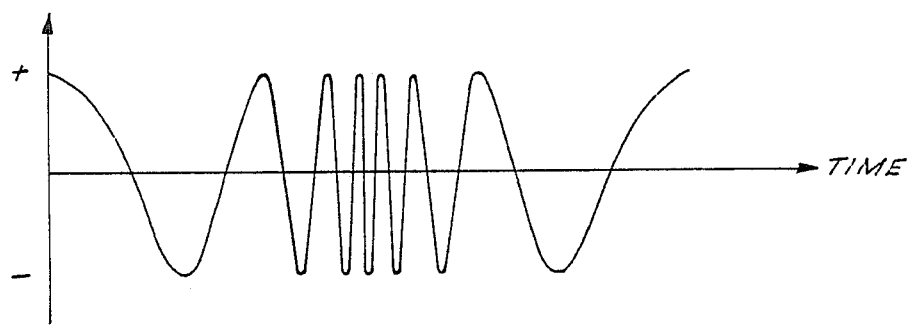

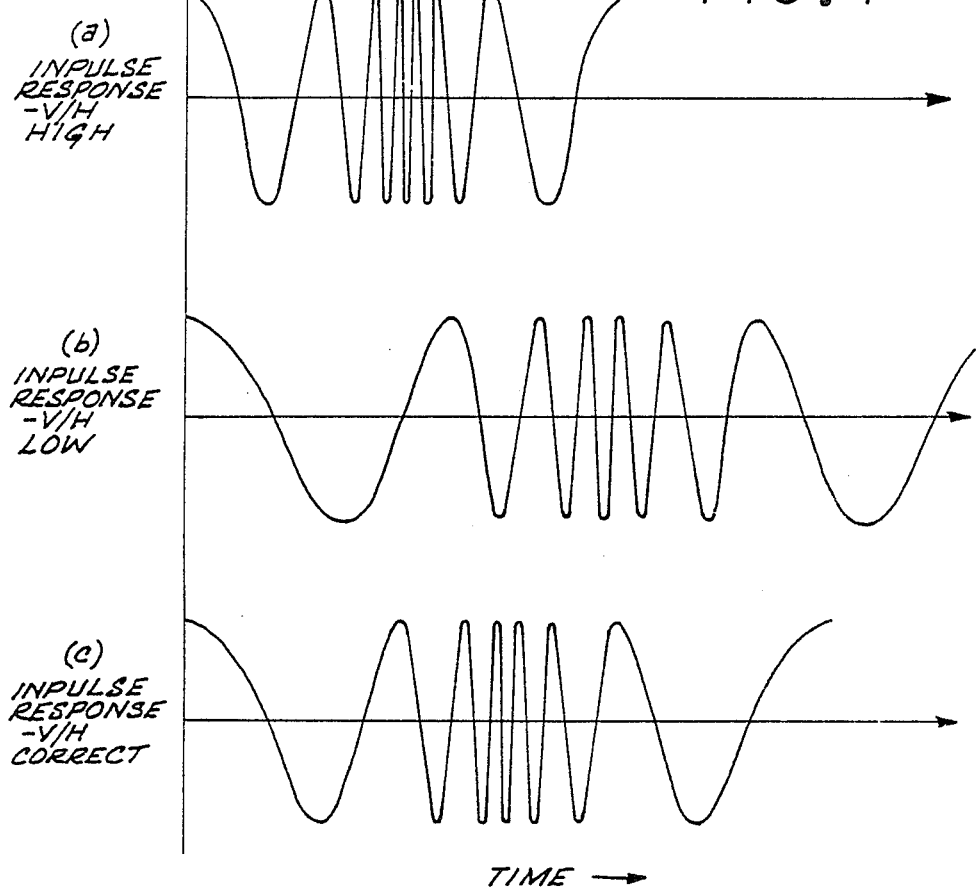
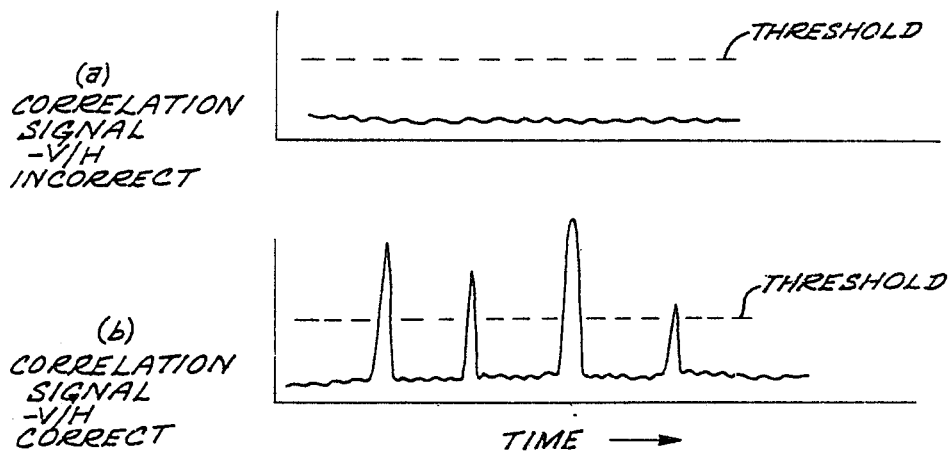

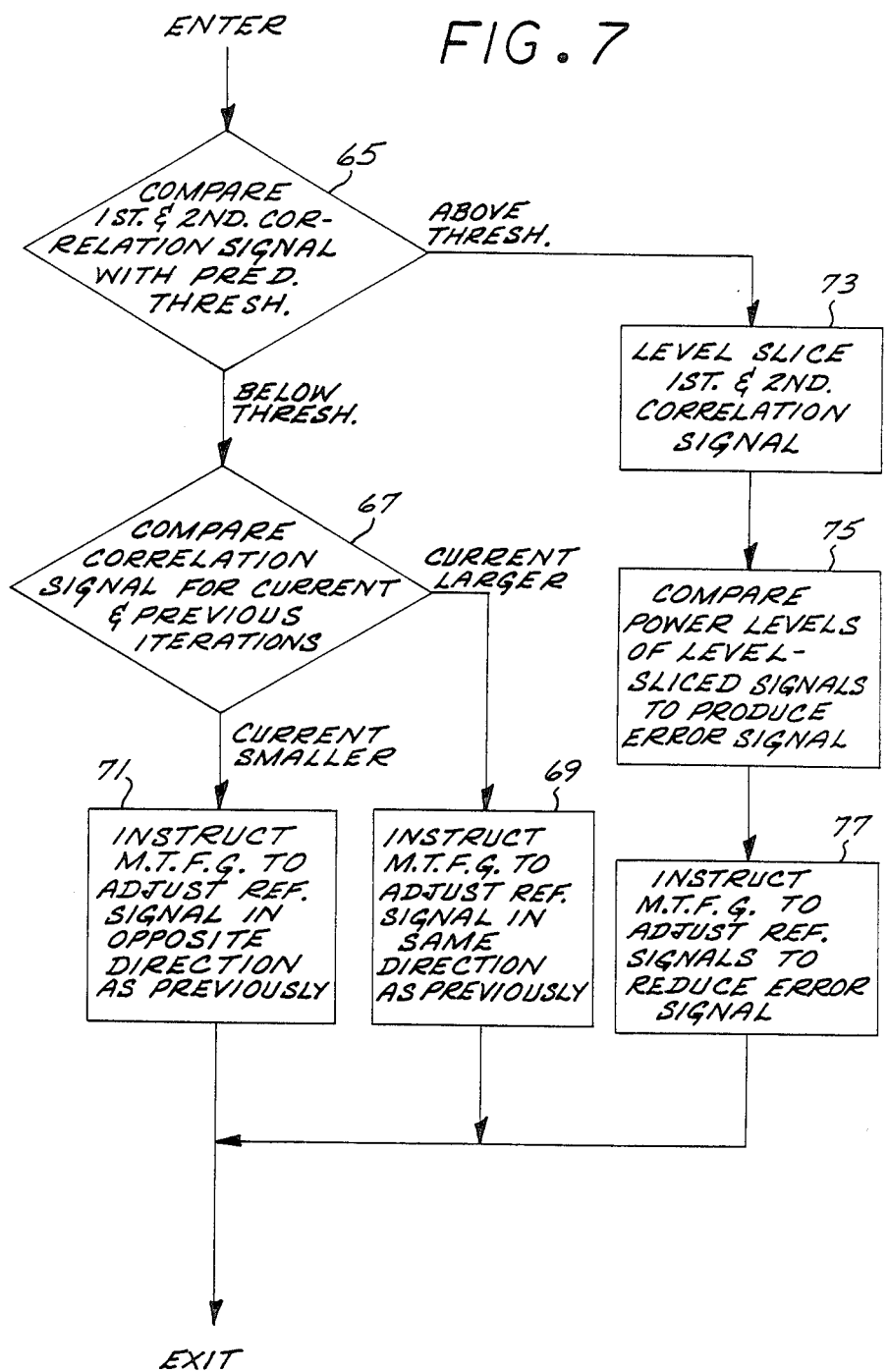

METHOD AND APPARATUS FOR PRECISELY MEASURING RELATIVE VELOCITY IN AN INTERFEROMETRIC RADIOMETER

BACKGROUND OF THE INVENTION

This invention relates generally to radiometric imagers that use a scanning interferometer, and, more particularly, to methods and apparatus for precisely measuring the velocity of an interferometer relative to a scene being scanned.

Radiometric imagers have numerous practical applications, including the mapping of terrestrial, celestial and oceanic features, the measuring of atmospheric water vapor, rain and sea surface temperature; and the assessment of hydrographic phenomena and surface conditions beneath clouds or rain.

One kind of radiometric imager, which uses a scanning interferometer, is described in a copending and commonly-assigned U.S. patent application, Ser. No. 607,848, filed May 7, 1984, in the name of Carl A. Wiley and entitled "Interferometric Radiometer." The radiometer disclosed in that copending application utilizes an interferometer having a fringe pattern with a series of sensitivity lobes of predetermined widths. As the interferometer scans a scene, it produces an interferometer signal based on the superimposed contributions of all of the emitters of radiation in the interferometer's field of view. The radio-frequency distribution of the scene along the direction of the scan can then be reconstructed using a predetermined signature or matched filter reference signal that corresponds to the interferometer signal that would result from the interferometer scanning a single, constant point emitter of radiation in the scene being scanned. Preferably, a fast Fourier transform of the interferometer signal is multiplied by the complex conjugate of a fast Fourier transform of the matched filter signal, after which the inverse Fourier transform of the resulting product is computed, to collapse the data. The collapsed data indicates the location and intensity of all point sources of radiation in the scene being scanned. Substantially similar results can be obtained by comparing the interferometer signal with the stored matched filter signal, in the time domain, using either convolution or cross-correlation.

The radiometric imager described in the copending application requires the use of a matched filter signal that corresponds precisely with the interferometer signal that would result from scanning a single, fixed emitter of radiation. Because the proper matched filter signal varies in accordance with the relative tangential velocity of the interferometer and the scene being scanned, however, proper imaging cannot be achieved without knowledge of the precise relative velocity. This tangential velocity corresponds to the true velocity of the interferometer relative to the scene divided by the range, i.e., V/H.

In the past, the relative tangential velocity of the interferometer and the scene being scanned has been determined using any of a number of alternative techniques, none of which has proven to be entirely satisfactory. One such technique measures the rate at which the interferometer's successive lobes are crossed by individual point emitters of radiation in the scene. Another technique utilizes triangulation to determine the change in the interferometer's position over a specified time period. Although techniques such as these for determining the relative velocity are generally effective, they are believed to be unduly complicated or not sufficiently accurate to enable creation of radiometric images of the desired resolution.

It should, therefore, be appreciated that there is a need for an improved method and apparatus for measuring the tangential velocity of an interferometer in a radiometric imager relative to a scene being scanned, that is not unduly complex or expensive and that provides a relative velocity measurement of high precision. The present invention fulfills this need.

SUMMARY OF THE INVENTION

The present invention is embodied in an apparatus and related method for measuring the relative tangential velocity of an interferometer and a scene being scanned, by correlating a signal from the interferometer with a signature or matched filter reference signal that is controllably adjusted to maximize the correlation. The matched filter reference signal corresponds to the interferometer signal that would result from scanning a single point source of radiation at a predetermined relative velocity. Correlation means correlates this matched filter reference signal with the interferometer signal, to produce a corresponding correlation signal, and feedback means, responsive to the correlation signal, controllably adjusts the reference signal to substantially maximize the correlation. The apparatus thereby can produce an accurate measurement of the relative translational velocity of the interferometer and the scene being scanned, in an efficient, reliable fashion.

More particularly, the apparatus of the invention is part of a radiometric imager, and the various elements of the apparatus all operate iteratively, to produce successively more accurate measurements of relative velocity. In one embodiment of the invention, reference signal means provides two matched filter reference signals, one corresponding to a predetermined high relative velocity and the other corresponding to a predetermined low relative velocity. The correlation means correlates the interferometer signal with both of the reference signals, to produce high and low correlation signals, for processing by the feedback means. With each successive iteration, the feedback means controllably adjusts the reference signal means such that it produces high and low reference signals that are successively closer approximations to the optimum reference signal. When the optimum reference signal is finally reached, it indicates the precise relative velocity of the interferometer and the scene being scanned.

In other aspects of the invention, the feedback means can further compare the power levels determined for the high and low correlation signals and produce a corresponding error signal for controllably adjusting the reference signal means. When the power levels are determined to be substantially equal to each other, the apparatus determines the relative velocity measurement to be equal to a velocity substantially midway between the corresponding high and low velocities. Level slicer means can further be included for comparing the high and low correlation signals with predetermined thresholds and permitting the comparison of their respective power levels only when the thresholds are exceeded.

Other aspects and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 1 is a simplified diagrammatic view of an interferometric radiometer in accordance with the invention, shown with a schematic depiction of the interferometer's series of sensitivity lobes;

FIG. 2 is a graph of an interferometer signal produced by the radiometer of FIG. 1 as it scans a single point source of radiation;

FIGS. 4(a)-(c) are graphs of three typical matched filter signals that are generated by the velocity measurement system of FIG. 3, the three signals corresponding to velocity estimates that are too high, too low, and correct, respectively;

FIGS. 5(a)-(b) depict two correlation signals produced by the velocity measurement system of FIG. 3, a first correlation signal resulting from the use of matched filter reference signals that are based on a velocity estimate that is too high or too low, and a second correlation signal resulting from the use of a matched filter reference signal based on a velocity estimate that is correct;

FIG. 7 is a simplified flowchart showing the steps performed by the decision-making block in the velocity measurement system of FIG. 3.

DESCRIPTION OF THE PREFERRED EMBODIMENT

Figure 3:
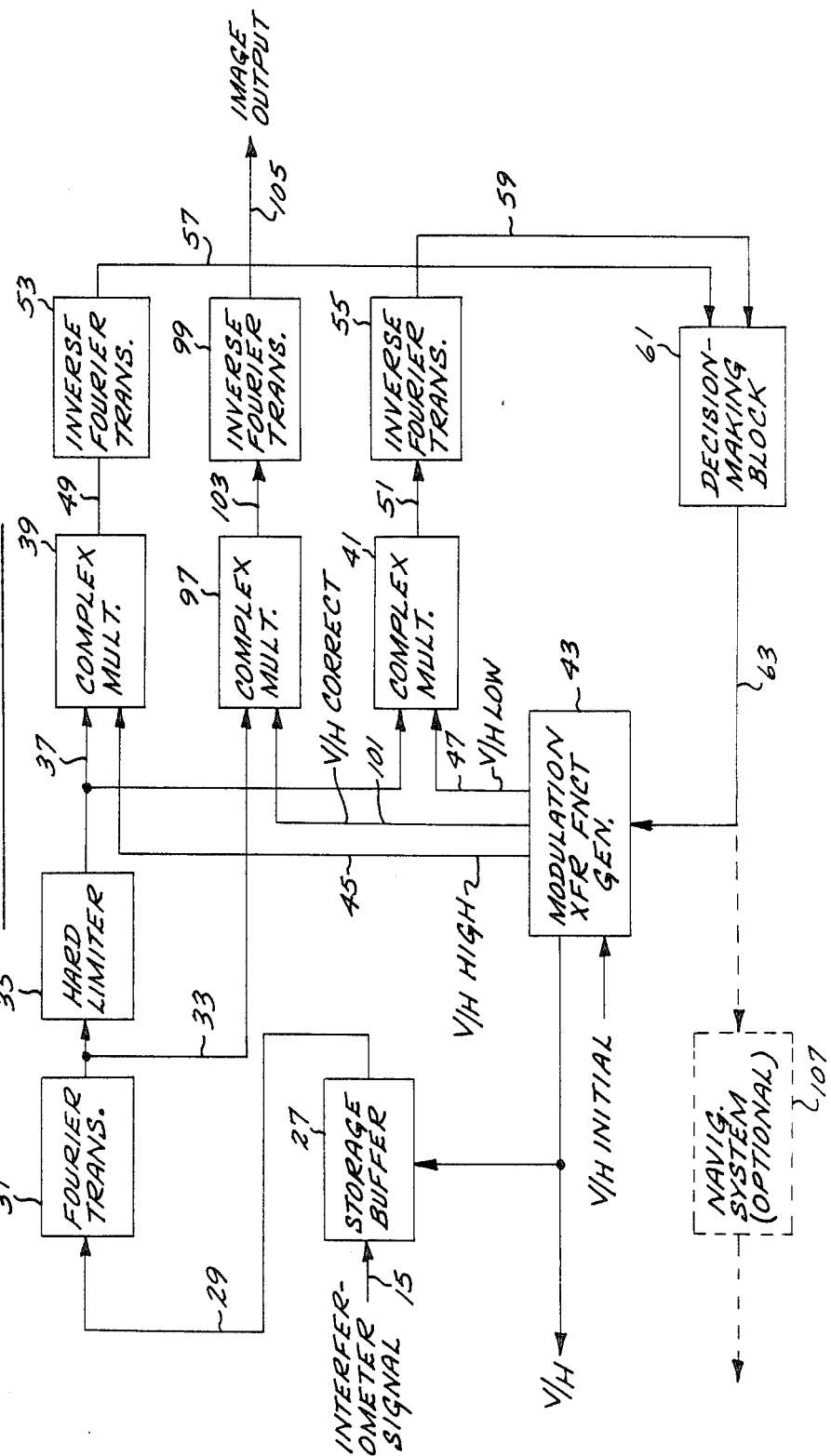
FIG. 3 is a simplified block diagram of the matched filter velocity measurement system and imaging system of the radiometer of FIG. 1.

With reference now to the drawings, and particularly to FIG. 1, there is shown an interferometric radiometer that includes an interferometer 11 for scanning a scene (not shown) and generating an interferometer signal that is supplied on line 13 to an imaging system 15 for suitable processing, to produce an image of the scene. The interferometer includes two antenna elements 17 and 19 and a multiplier 21 for multiplying together the two antenna signals to produce the interferometer signal. The imaging system then correlates the interferometer signal with a predetermined reference signal to produce the image. One suitable interferometer and imaging system of this kind is described in detail in the copending application identified above, i.e., Ser. No. 607,848, which is incorporated by reference.

The interferometer 11 has a fringe pattern 23 with a series of lobes of varying widths. As the interferometer scans the scene, each point source of radiation in the scene thus contributes to the interferometer signal in a continuously varying fashion, which is depicted in FIG. 2. Since multiple radiation sources are usually present across the entire field of view of the interferometer, the contributions of these individual sources are superimposed on each other to produce an interferometer signal having the appearance of random noise. The imaging system 13 correlates this seemingly noisy interferometer signal with a predetermined matched filter reference signal, to collapse the information contained in the signal into a series of spikes that represent the various point sources of radiation in the scene.

To determine the appropriate matched filter reference signal for use in collapsing the data, it is necessary to know, with significant precision, the actual relative angular velocity of the interferometer 11 and the scene being scanned. FIGS. 4(a)-(c) depict three exemplary matched filter reference signals corresponding to high, medium and intermediate velocity estimates, respectively. It will be observed that the three signals all have the same general shape, and differ only along the time axis. The particular reference signal that best collapses the data is determined by a matched filter V/H measurement system 25, based on the interferometer signal supplied on line 15. From this determination, an extremely precise measurement of the relative velocity can be obtained.

The relative velocity that is of consequence and that is measured by the V/H measurement system 25 is actually the relative angular velocity of the interferometer 11 and the scene being scanned. This relative angular velocity is directly proportional to the relative tangential velocity, i.e., V, and inversely proportional to the distance between the interferometer and the scene, i.e., H.

In accordance with the invention, the matched filter V/H measurement system 25 measures the relative velocity of the interferometer 11 and the scene by selecting the particular matched filter reference signal that maximizes a correlation between the reference signal and the incoming interferometer signal. This will be better understood with more particular reference to FIG. 3, which is a simplified block diagram of the matched filter V/H measurement system of FIG. 1. In an iterative fashion, the measurement system correlates the interferometer signal with estimates of the proper matched filter reference signal. This correlation is performed in the frequency domain, by Fourier transforming the various signals.

More particularly, the interferometer signal supplied on line 15 is initially placed into a storage buffer 27 and, in turn, supplied on line 29 to a Fourier transform device 31, for mapping into a corresponding signal in the frequency domain. The Fourier-transformed signal is then supplied on line 33 to a hard limiter 35, which ensures that the system will respond to the strongest source of radiation in the scene being scanned. The hard-limited signal is supplied on line 37 to two separate complex multipliers 39 and 41, whose function will be described below.

A modulation transfer function generator 43 generates two separate modulation transfer function signals, which correspond to the complex conjugates of the Fourier transforms of the expected interferometer signal that would result from scanning a single point source of radiation at two separate relative velocities. One transfer function signal is based initially on the highest relative velocity that could be expected, while the other transfer function signal is based on the lowest relative velocity that could be expected. These high and low transfer function signals are supplied on lines 45 and 47, respectively, to the two separate complex multipliers 39 and 41, for multiplication by the hard-limited, Fourier-transformed interferometer signals supplied on line 37.

The product signals produced by the complex multipliers 39 and 41 are supplied on lines 49 and 51 to inverse Fourier transform devices 53 and 55, respectively, map the signals back into the time domain. The resulting correlation signals are then analyzed to determined the accuracy of the high and low velocity estimates so that appropriate corrections can be made.

The high and low correlation signals are supplied on lines 57 and 59 from the inverse Fourier transform devices 53 and 55, respectively, to a decision-making block 61, which generates control signals for coupling on line 63 back to the modulation transfer function generator 43. The generator responds by making appropriate corrections to the high and low modulation transfer function signals it generates for the next succeeding iteration.

When the modulation transfer function signal coupled to either of the complex multipliers 39 and 41 reflects a matched filter reference signal that is highly uncorrelated with the individual contributions to the interferometer signal provided by each point source of radiation in the scene being scanned, the resulting correlation signal will appear like random noise. This is depicted in FIG. 5(a). On the other hand, when the modulation transfer function signal is based on a matched filter reference signal that does indeed correlate well with the individual contributions to the interferometer signal made by individual point sources of radiation, the data contained in the interferometer signal will be collapsed into a series of sharp spikes in the resulting correlation signal. This is depicted in FIG. 5(b). Each spike represents a separate point source of radiation. The position of each spike in the waveform indicates the specific location of the source in the scene being scanned, and the magnitude of each spike indicates the intensity of the received radiation.

As previously mentioned, the modulation transfer function generator 43 initially produces two modulation transfer function signals, one reflecting a high estimate of relative velocity and the other a low estimate. If the decision-making block 61 determines that the two correlation signals supplied to it on lines 57 and 59 do not include any spikes (FIG. 5(a)), indicating that the two velocity estimates are incorrect, it instructs the modulation transfer function generator to modify the high and low modulation transfer function signals it generates for the next iteration. In the preferred embodiment, the generator 43 generates new signals based on a reduced estimate of the high velocity and an increased estimate of the low velocity.

Eventually, one or both of the correlation signals present on lines 57 and 59 will contain spikes (FIG. 5(b)), indicating that the data in the interferometer signal has been collapsed. From this, it can be deduced that the corresponding modulation transfer function signal is based on a velocity estimate that is at or near the actual relative velocity. The decision-making block 61 then sends appropriate signals to the modulation transfer function generator 43 to make appropriate adjustments to the signals it generates so that, in successive iterations, the power level of these spikes will be maximized.

FIG. 7 is a simplified flowchart depicting the operational steps performed in each iteration by the decision-making block 61 of FIG. 3. These steps control the modulation transfer function generator 43 so as to maximize the correlation between the modulation transfer function signals and the Fourier-transformed interferometer signal. In an initial step 65, the decision-making block compares the high and low correlation signals with predetermined thresholds 66 (FIGS. 5(a)-(b)). These thresholds are selected such that the correlation signals ordinarily exceed them only when the data in the interferometer signal is being collapsed, i.e., when the modulation transfer function signals present on lines 45 and 47 are based on velocity estimates at or near the actual relative velocity of the interferometer 11 and the scene being scanned.

Initially, the correlation signals present on lines 57 and 59 will ordinarily be substantially less than the predetermined thresholds. In that case, the program proceeds to a step 67, in which the power levels of the correlation signals for the current iteration are compared with the power levels for the previous iteration. If the current power levels are larger, it is deduced that the modulation transfer functions were previously adjusted in the correct direction, i.e., the signals for the current iteration are based on velocity estimates that are closer to the actual relative velocity than were the velocity estimates for the previous iteration. In this case, the program proceeds to step 69, in which the modulation transfer function generator 43 is instructed to adjust its output signals for the next iteration in the same direction as was done previously, for the current iteration.

On the other hand, if it is determined at step 67 that either correlation signal has a lower power level for the current iteration than for the previous iteration, the program proceeds to step 71, in which the modulation transfer function generator 43 is instructed to adjust its corresponding transfer function signal in a direction opposite to the adjustment it previously made, for the current iteration.

Eventually, an iteration will be reached in which it will be determined at step 65 that both of the correlation signals present on lines 57 and 59 will be above the predetermined thresholds. This indicates that the high and low modulation transfer function signals present on lines 45 and 47, respectively, are both based on velocity estimates at or near the actual relative velocity of the interferometer 11 relative to the scene being scanned. Fine tuning of the signals can still be performed, to cause the two modulation transfer function signals to converge to a common signal that is based on a velocity estimate that corresponds very precisely with the actual relative velocity. This is achieved by following steps 73, 75 and 77.

In step 73, the high and low correlation signals present on lines 57 and 59, respectively, are level sliced such that only the spikes exceeding predetermined thresholds are transmitted. In a following step 75, the power levels of the two level-sliced signals are compared with each other, to produce an error signal proportional to the difference. In step 77, this error signal is supplied to the modulation transfer function generator 43 (FIG. 3), so that in the next iteration, the high and low modulation transfer function signals will result in level-sliced correlation signals having power levels more equal to each other. Eventually, an iteration will be reached in which the power levels are, indeed, equal. When this occurs, the actual relative velocity of the interferometer 11 and the scene being scanned is determined to be a velocity that is the average of the high and low velocity estimates on which the high and low modulation transfer function signals are based.

Figure 6:
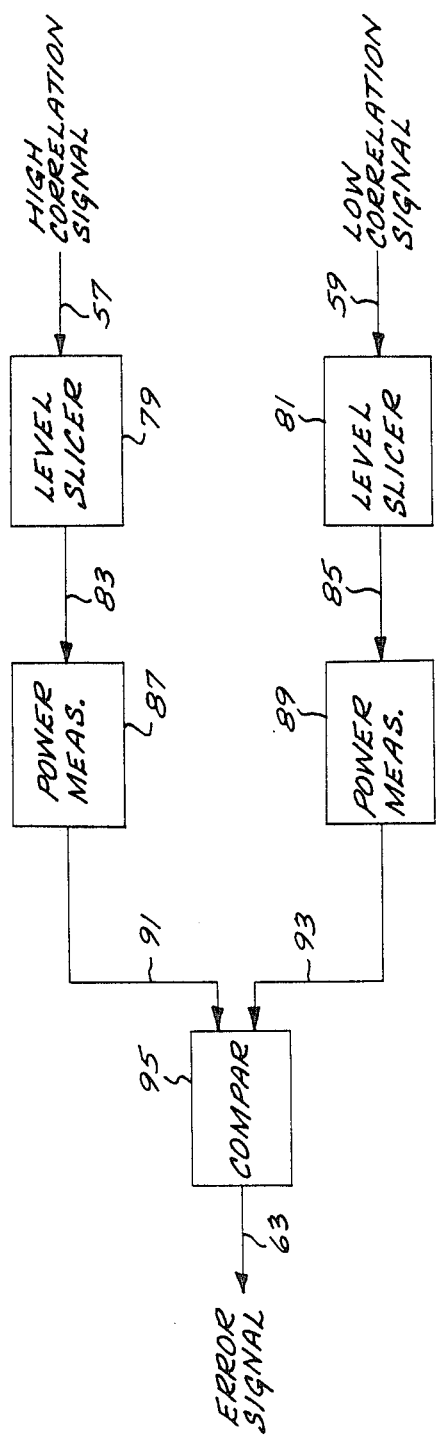
FIG. 6 is a more detailed block diagram of the decision-making block in the velocity measurement system of FIG. 3.

FIG. 6 is a simplified block diagram of a portion of the hardware included in the decision-making block 61, in carrying out the process steps identified in the flowchart in FIG. 7. In particular, two level slicers 79 and 81 select the portions of the respective high and low correlation signals supplied on lines 57 and 59 that are above predetermined thresholds and output these portions on lines 83 and 85, respectively. Power measuring circuits 87 and 89 measure the power levels of these respective level-sliced signals and supply the respective power measurements on lines 91 and 93 to a comparator 95.

The comparator, in turn, outputs an error signal on line 63 indicating the power level difference.

It will be appreciated that the search algorithm set forth in FIGS. 6 and 7 is exemplary, only. Many other matched filter-type techniques for determining relative velocity, which correlate the interferometer signal with predetermined local reference signals, can also be used.

For example, the interferometer signal can be correlated with a number (e.g., ten) of reference signals, and the particular reference signal that correlates best is used as an initial, coarse velocity estimate. Thereafter, the interferometer signal is correlated again with a number of reference signals that form a range around the reference signal previously determined to provide the best correlation. This iterative process continues until a reference signal of the desired precision is obtained.

In another example, the interferometer signal is repeatedly correlated with just a single reference signal that is repeatedly adjusted over a predetermined range. The particular reference signal that provides the best correlation is then used to determine the interferometer's relative velocity.

It also will be appreciated that correlating the interferometer signal with each reference signal in the frequency domain, using Fourier transforms, is exemplary only. The correlation can alternatively be performed in the time domain, using conventional convolution or cross-correlation.

After the correct relative velocity for the interferometer 11 and the scene being scanned has been determined, the proper matched filter signal and/or modulation transfer function signal can be used to operate on the interferometer signal and collapse the data contained in it into a high-resolution image of the scene being scanned. Thus, with reference again to FIG. 3, the radiometer is depicted to further include another complex multiplier 97 and associated inverse Fourier transform device 99. The modulation transfer function generator 43 outputs on line 101 a modulation transfer function signal that is based on the correctly determined relative velocity. It will be recalled that this correct velocity is midway between the particular high and low velocity estimates that resulted in the two level-sliced correlation signals present on lines 83 and 85 (FIG. 6) to have equal power levels.

The complex multiplier 97 multiplies together the modulation transfer function signal supplied on line 101 and the Fourier-transformed interferometer signal present on line 33. The resulting product is transmitted on line 103 to the inverse Fourier transform device 99, which collapses the data and generates an image signal for output on line 105. It should be noted that the Fourier-transformed interferometer signal used in the complex multiplier 97 is not first processed in the hard limiter 35. This is because the data for all pixels in the scene being scanned is considered important, not merely those in which the largest emitters of radiation are located.

Also depicted in FIG. 3 is an optional navigation system 107, which receives the servo error signal output by the decision-making block 61 on line 63. The navigation system is a long time constant device that computes navigational datums, such as position and velocity, using dead reckoning. These datums drift from their actual values because of errors in the dead reckoning computations. Using techniques well known to those skilled in the art, the servo error signal can be used to produce velocity datums with significantly reduced noise. In addition, secular perturbations due to drift are removed.

It should be appreciated from the foregoing description that the present invention provides an improved apparatus and method for precisely determining the relative velocity of an interferometer and a scene being scanned. The apparatus uses a matched filter technique in which reference signals based on high and low relative velocity estimates are correlated with an incoming interferometer signal and controllably adjusted until the correlation is maximized. The controllably adjusted reference signals are then used to produce an extremely accurate and precise measurement of relative velocity.

Although the present invention has been described in detail with reference to the presently-preferred embodiment, those of ordinary skill in the art will appreciate that various modifications can be made without departing from the invention. Accordingly, the invention is defined only by the following claims.

We claim:

1. Apparatus for measuring the relative velocity of an interferometer and a scene being scanned by the interferometer, wherein the apparatus measures relative velocity without the need for transmitting any signals toward the scene, the apparatus comprising:
   an interferometer having a predetermined non-uniform fringe pattern, for scanning a scene and producing a corresponding interferometer signal;
   reference signal means for providing a matched filter reference signal that corresponds to the interferometer signal that would result from the interferometer scanning the entire scene, with a single point source of radiation being located in the scene, at a predetermined velocity for the interferometer relative to the scene;
   correlation means for correlating the interferometer signal with the matched filter reference signal and producing a corresponding correlation signal; and
   feedback means, responsive to the correlation signal, for controllably adjusting the reference signal means to produce a matched filter reference signal that substantially maximizes the correlation between that reference signal and the interferometer signal, determined by the correlation means, such that the reference signal means produces an accurate measurement of the relative velocity of the interferometer and the scene.

2. Apparatus as defined in claim 1, wherein:
   the reference signal means includes means for generating a modulation transfer function signal that corresponds to the Fourier transform of the matched filter reference signal; and
   the correlation means includes
      transform means for computing the Fourier transform of the interferometer signal,
      complex multiplier means for multiplying together the modulation transfer function signal and the Fourier-transformed interferometer signal, to produce a product signal, and
      inverse transform means for computing the inverse Fourier transform of the product signal, to produce the correlation signal.

3. Apparatus as defined in claim 2, wherein the correlation means further includes means for hard-limiting the Fourier-transformed interferometer signal, prior to multiplication by the complex multiplier 4. Apparatus as defined in claim 1, wherein:

the reference signal means provides high and low matched filter reference signals, the high signal corresponding to a predetermined high relative velocity and the low signal corresponding to a predetermined low relative velocity;

the correlation means includes means for correlating the interferometer signal with both the high and the low matched filter reference signals, to produce high and low correlation signals; and the feedback means is responsive to both the high and the low correlation signals and controllably adjusts the reference signal means such that it provides high and low matched filter reference signals that correlate more closely with the interferometer signal.

5. Apparatus as defined in claim 4, wherein:

the reference signal means, correlation means, and feedback means all operate iteratively; and the feedback means includes means for comparing the high and low correlation signals for the current and previous iterations and for adjusting the reference signal means such that it provides high and low matched filter reference signals for the next succeeding iteration that are expected to increase the correlations of both reference signals with the interferometer signal, determined by the correlation means.

6. Apparatus as defined in claim 5, wherein the feedback means further includes:

power means for measuring the power levels of the high and low correlation signals; and comparison means for comparing the power levels measured by the power means for the high and low correlation signals and for producing a corresponding error signal for controllably adjusting the reference signal means.

7. Apparatus as defined in claim 6, wherein:

the power means includes level slicer means for comparing the high and low correlation signals with predetermined thresholds; and the comparison means compares the power levels determined for the high and low correlation signals only when the level slicer means determines that the signals have exceeded the predetermined thresholds.

8. Apparatus as defined in claim 6, wherein the reference signal means includes means for determining the measurement of relative velocity of the interferometer and the scene to be a velocity substantially midway between the predetermined high and low velocities when the comparison means determines the power levels for the high and low correlation signals are substantially equal.

9. Apparatus as defined in claim 1, wherein the reference signal means, correlation means, and feedback means all operate iteratively; and the feedback means includes means for comparing the correlation signals for the current and previous iterations and for adjusting the reference signal means such that it provides a matched filter reference signal for the next succeeding iteration that is expected to increase the correlation with the interferometer signal, determined by the correlation means.

10. A method for measuring the relative velocity of an interferometer and a scene being scanned by the interferometer, the velocity measurement being made without the need for transmitting any signals toward the scene, the method comprising steps of:

scanning a scene using an interferometer having a predetermined non-uniform fringe pattern, and producing a corresponding interferometer signal;

providing a matched filter reference signal that corresponds to the interferometer signal that would result from the interferometer scanning the entire scene, with a single point source of radiation being located in the scene, at a predetermined velocity for the interferometer relative to the scene;

correlating the interferometer signal with the matched filter reference signal and producing a corresponding correlation signal; and controllably adjusting the matched filter reference signal in accordance with the correlation signal, to substantially maximize the correlation between the adjusted reference signal and the interferometer signal, determined in the step of correlating, and to thereby produce an accurate measurement of the relative velocity of the interferometer and the scene.

11. A method as defined in claim 10, wherein:

the step of providing includes a step of generating a modulation transfer function signal that corresponds to the Fourier transform of the matched filter reference signal; and the step of correlating includes steps of computing the Fourier transform of the interferometer signal, multiplying together the modulation transfer function signal and the Fourier-transformed interferometer signal, to produce a product signal, and computing the inverse Fourier transform of the product signal, to produce the correlation signal.

12. A method as defined in claim 11, wherein the step of correlating further includes a step of hard-limiting the Fourier-transformed interferometer signal, prior to multiplication in the step of multiplying.

13. A method as defined in claim 10, wherein:

the step of providing includes steps of providing high and low matched filter reference signals, the high signal corresponding to a predetermined high relative velocity and the low signal corresponding to a predetermined low relative velocity;

the step of correlating includes steps of correlating the interferometer signal with both the high and the low matched filter reference signals, to produce high and low correlation signals; and the step of controllably adjusting is responsive to both the high and the low correlation signals and includes a step of controllably adjusting the high and low matched filter reference signals such that they correlate more closely with the interferometer signal, determined in the step of correlating 14. A method as defined in claim 13, wherein:

the steps of providing, correlating and controllably adjusting are all performed iteratively; and the step of controllably adjusting includes steps of comparing the high and low correlation signals for the current and previous iterations and adjusting the high and low matched filter reference signals for the next succeeding iteration such that they are expected to increase the correlations of both reference signals with the interferometer signal, determined in the step of correlating.

15. A method as defined in claim 14, wherein the step of controllably adjusting further includes steps of:

measuring the power levels of the high and low correlation signals; and comparing the power levels determined for the high and low correlation signals and producing a corresponding error signal for controllably adjusting the high and low matched filter reference signals.

16. A method as defined in claim 15, wherein:

the step of measuring includes a step of level slicing the high and low correlation signals using predetermined thresholds; and the step of comparing compares the power levels determined for the high and low correlation signals only when the step of level slicing determines that the signals have exceeded the predetermined thresholds.

17. A method as defined in claim 15, wherein the step of providing includes a step of determining the measurement of relative velocity of the interferometer and the scene to be a velocity substantially midway between the predetermined high and low velocities when the step of comparing determines the power levels for the high and low correlation signals are substantially equal.

18. A method as defined in claim 10, wherein:

the steps of providing, correlating, and controllably adjusting are all performed iteratively; and the step of controllably adjusting includes steps of comparing the correlation signals for the current and previous iterations and adjusting the matched filter reference signal for the next succeeding iteration such that it is expected to increase the correlation with the interferometer signal, determined in the step of correlating.

19. Apparatus for iteratively measuring the relative velocity of an interferometer and a scene being scanned by the interferometer, comprising:

an interferometer having a predetermined fringe pattern, for scanning a scene and producing a corresponding interferometer signal;

transform means for computing the Fourier transform of the interferometer signal;

means for hard-limiting the Fourier-transformed interferometer signal;

reference signal means for generating high and low modulation transfer function signals corresponding to the complex conjugate of the Fourier transform of the interferometer signal that would result from scanning a single point source of radiation in the scene being scanned, at predetermined high and low relative velocities for the interferometer and the scene;

complex multiplier means for multiplying the hard-limited, Fourier-transformed interferometer signal with both the high and the low modulation transfer function signals, to produce high and low product signals;

inverse transform means for computing the inverse Fourier transform of the high and low product signals, to produce high and low correlation signals;

wherein the apparatus operates iteratively, each successive iteration providing a more accurate measurement of relative velocity; and feedback means, responsive to both the high and the low correlation signals, for controllably adjusting the reference signal means such that it provides high and low modulation transfer function signals for the next succeeding iteration, that correlate more closely with the hard-limited, Fourier-transformed interferometer signal, determined by the inverse transform means, wherein the feedback means includes level slicer means for comparing the high and low correlation signals with predetermined thresholds, power means for measuring the power levels of the portions of the high and low correlation signals that exceed the predetermined thresholds, and comparison means for comparing the power levels of the high and low correlation signals measured by the power means, to generate a corresponding error signal, wherein the reference signal means adjusts the high and low modulation transfer function signals for the next succeeding iteration in accordance with the error signal, and wherein the measured relative velocity of the interferometer relative to the scene being scanned is determined to be midway between the high and low relative velocities on which the respective high and low modulation transfer function signals are based, in each iteration.

* * * * *